United States Patent
Chung et al.

(10) Patent No.: US 6,604,099 B1
(45) Date of Patent: Aug. 5, 2003

(54) MAJORITY SCHEMA IN SEMI-STRUCTURED DATA

(75) Inventors: Christina Yip Chung, Davis, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 09/628,097

(22) Filed: Jul. 27, 2000

Related U.S. Application Data

(63) Continuation-in-part of application No. 09/531,019, filed on Mar. 20, 2000.

(51) Int. Cl.[7] .............................................. G06F 17/30
(52) U.S. Cl. .......................... 707/3; 707/10; 707/513; 717/104
(58) Field of Search ........................... 707/3, 513, 100, 707/10, 4, 5, 6, 104.1, 205, 2; 717/104; 705/14, 10; 709/315, 223, 220; 713/176

(56) References Cited

U.S. PATENT DOCUMENTS

| | | | | |
|---|---|---|---|---|
| 5,524,240 A | * | 6/1996 | Barbara et al. | 707/3 |
| 5,915,259 A | * | 6/1999 | Murata | 707/513 |
| 5,937,407 A | * | 8/1999 | Sakata | 707/100 |
| 5,970,490 A | * | 10/1999 | Morgenstern | 707/10 |

OTHER PUBLICATIONS

Rodrigo A. Botafogo and Ben Shneiderman. Identifying aggregates in hypertext structures. In Proceedings of ACM Hypertext'91, Discovering Structure I, pp. 63–74, 1991.

Tao Guan and Kam Fai Wong. KPS—a Web Information Mining Algorithm. In The Eighth Internatioanl World Wide Web Conference, pp. 11–14, Toronto Convention Cenrter, Toronto, Canada, May 1999.

S. Nestorov, S. Abiteboul, and R. Motwani. Inferring structure in semistructured data. In Workshop on Management of Semistructured Data, 1997.

S. Nestorov, S. Abiteboul, and R. Motwani. Extracting schema from semistructured data. In SIGMOD, pp. 295–306, 1998.

Seongbin Park. Structural properties of hypertext. In Proceedings of the Ninth ACM Conference on Hypertext, Structural Models, pp. 180–187, 1998.

Dave Raggett. Clean up your Web pages with HP's HTML Tidy. http://www.w3.org/People/Raggett/tidy/, Jul. 2000.

Ke Wang and H. Q. Liu Discovering Structural Association of Semistructured Data. IEEE Transactions on Knowledge and Data Engineering, TDKE, 2000.

IBM Almaden Research Center. IBM: all searches start at Grand Central. Network World, page front page, Nov. 1997.

Tim Bray, Jean Paoli, and C. M. Sperberg–McQueen. Extensible markup language (XML) 1.0. REC–xml–19980210, World Wide Web Consortium, Feb. 1998.

Dave Raggett. HTML 3.2 reference specification, W3C recommendation.REC–html32, World Wide Web Consortium, Jan. 1997.

* cited by examiner

Primary Examiner—Dov Popovici
Assistant Examiner—Hassan Mahmoudi
(74) Attorney, Agent, or Firm—Samuel A. Kassatly

(57) ABSTRACT

A schema discovery system and associated method discover a majority schema for a set of related and similarly marked up documents, such as HTML documents, based on the assumption that though the structure of these documents is mostly for visual purposes, the keywords used in the documents along with the structural tags provide some hints, and allow a rough sketch of the underlying intended schema. With the assumption that albeit the set of HTML documents are marked up differently due to diverse authoring skills, they are closely related in content, it is reasonable to find a schema that can unify these different schemas, which schema is shared by the majority of these HTML documents. The system employs constraint rules on tree ordering to reduce the computational complexity in arriving at optimized XML DTD schema. These generalized XML DTD schemas may be used to perform automated comparison and evaluation schemes of profile documents on the WWW.

9 Claims, 7 Drawing Sheets

MAJORITY SCHEMA IN SEMI-STRUCTURED DATA

CROSS-REFERENCE TO RELATED APPLICATIONS

The present invention is a continuation-in-part application of copending U.S. patent application Ser. No. 09/531,019, filed Mar. 20, 2000, titled "System and Method for Discovering Schematic Structure in Hypertext Documents," assigned to the same assignee as the present invention, and incorporated herein in its entirety by reference.

FIELD OF THE INVENTION

The present invention relates to the field of automated information retrieval in the context of document processing. Particularly, the present invention relates to a system and associated method for discovering a majority schema from a set of related documents that share similar but not identical schemas.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler, systematically accesses web pages by sequentially following hypertext links from page to page. The crawler indexes the pages for use by the search engines using information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

A typical search engine has an interface with a search window where the user enters an alphanumeric search expression or keywords. The search engine sifts through available web sites for the user's search terms, and returns the search of results in the form of HTML pages. Each search result includes a list of individual entries that have been identified by the search engine as satisfying the user's search expression. Each entry or "hit" may include a hyperlink that points to a Uniform Resource Locator (URL) location or web page.

In addition to the hyperlink, certain search result pages include a short summary or abstract that describes the content of the URL location. Typically, search engines generate this abstract from the file at the URL, and provide acceptable results for URLs that point to HTML format documents. For URLs that point to HTML documents or web pages, a typical abstract includes a combination of values selected from HTML tags. These values may include a text from the web page's "title" tag, from what are referred to as "annotations" or "meta tag values" such as "description", "keywords", etc., from "heading" tag values (e.g., H1, H2 tags), or from some combination of the content of these tags.

Automatic programs, such as web crawlers also known as spiders or robots, visit the web sites and extract information. For example, comparison shopping search engines visit web sites describing information, such as prices, and extract semantic information from these sites. Given the format variances between topically related web pages, the retrieved data are oftentimes unhelpful, unrelated or difficult to extract.

The present invention addresses the need to build search engines that allow users to formulate structural queries like "find a student with a Master's degree and a GPA of 3.5 or more and skills in Java." Heretofore, there is no fully adequate mechanism that allows the extraction of structural information buried in the web pages that cater to the same topic but are authored with significantly different styles.

Several attempts have been made to address this need, exemplary of which are the following references that generally describe methods of investigating the structure of documents and retrieving documents from large databases in response to user queries:

Rodrigo A. Botafogo, Ben Shneiderman, "Identifying Aggregates in Hypertext Structures," Proceedings of ACM Hypertext '91, pp. 63–74.

IBM Almaden Research Center, "All searches start at Grand Central," Network World, front page, November 1997.

Tao Guan, Kam-Fai Wong, "KPS: a Web Information Mining Algorithm," WWW8/Computer Networks 31(11–16): 1495–1507 (1999).

Seongbin Park, "Structural Properties of Hypertext," Proceedings of the Ninth ACM Conference on Hypertext, pp. 180–187, 1998.

Svetlozar Nestorov, Serge Abiteboul, Rajeev Motwani, "Inferring Structure in Semistructured Data," SIGMOD Record 26(4): 39–43 (1997).

Svetlozar Nestorov, Serge Abiteboul, Rajeev Motwani, "Extracting Schema from Semistructured Data," SIGMOD Conference 1998, pp. 295–306.

Ke Wang and H. Q. Liu, "Discovering Association of Structure from Semistructured Objects," IEEE Trans. on Knowledge and Data Engineering, 1999.

U.S. Pat. No. 5,694,592 to Driscoll describes a method of querying and retrieving documents from a database using semantic knowledge about the query string to determine document relevancy.

U.S. Pat. No. 5,848,407 to Ishikawa describes a method of presenting potentially related hypertext document summaries to a user who is using a search engine that indexes a plurality of hypertext documents.

However, the need for a system and associated method for discovering a majority schema (also referred to herein as common schema) from a set of related documents that share similar but not identical schemas has remained unsatisfied. For example, consider HTML documents, such as resumes, that describe the same concept but are marked up differently. Some authors may describe the degree by date, name, and the institute granting the degree, while other authors may describe the degree by name, institute granting the degree, and the date. Prospective employers searching for potential candidates may not pay attention to the order of description, and would rather have all degrees described in a conventional order. In addition, some candidates may include hobbies session in their resume, which information may be largely overlooked by employers. Briefly, prospective employers prefer to have a uniform view of the majority of the documents and search the repository of documents under such view.

Existing approaches do not offer a "majority schema" which is shared by most of the documents being searched, which presents a uniform and summary view of these documents and that can be used to guide the transformation of the HTML documents to a global schema in data integration. This need has heretofore remained unsatisfied.

SUMMARY OF THE INVENTION

The present invention teaches a schema discovery system and associated method that satisfy this need. In accordance with one embodiment, the system discovers a majority schema for a set of related and similarly marked up documents, such as HTML documents, based on the assumption that though the structure of these documents is mostly for visual purposes, the keywords used in the documents along with the structural tags provide some hints, and allow a rough sketch of the underlying intended schema. It is further assumed that albeit the set of HTML documents are marked up differently due to diverse authoring skills, they are closely related in content. Therefore, it is reasonable to assume the presence of a schema that can unify these different schemas, which schema is shared by the most (i.e., majority) of these HTML documents.

The copending U.S. patent application Ser. No. 09/531, 019 generally describes a process that uses visual clues and structural tags to extract basic schematic structures of HTML documents. The present invention describes a method that reconstructs a majority of schemas from these schematic structures. It also proposes constraints-based mechanism for domain experts to specify domain knowledge, if any, that can help the reconstruction process. The algorithm used by the present system may be summarized by the following process:

1. Extracting Schematic Structures:

The schematic structures of markup documents are extracted and represented as sets of ordered trees with nodes labeled by a set of keywords inputted from the user. Keywords identify important concepts in these documents. Reordering rules are used to reconfigure the trees so that its structure more closely resembles the semantic structures of a predefined template, such as an HTML document.

2. Convert XML to Label Paths

The ordered trees are mapped to sets of paths, ignoring ordering and repetitive information. The assumption is that choosing an imprecise representation helps reveal common patterns.

3. Discover Frequent Label Paths

Prevalent patterns among the trees are presumed to be label paths that occur frequently among all the documents. A constraint mechanism is introduced for users to specify a restriction on the forms of schematic structures in the majority schema. This helps reduce the search space and to filter out noise. The set of frequent label paths satisfying the constraints are discovered.

4. Unify Similar Structures

Since the documents share similar but inexact schematic structures, there are repetitive structures among the discovered common tree structures. These repetitive structures are discovered by a clustering approach based on a simple intuitive notion of tree distance. The repetitive structures are then unified.

5. Convert Label Paths to DTD

The set of labels is converted to a predefined structure schema, such as XML DTD schema. Information lost in the inexact representation of trees can be recovered by heuristics.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

Figure 1:
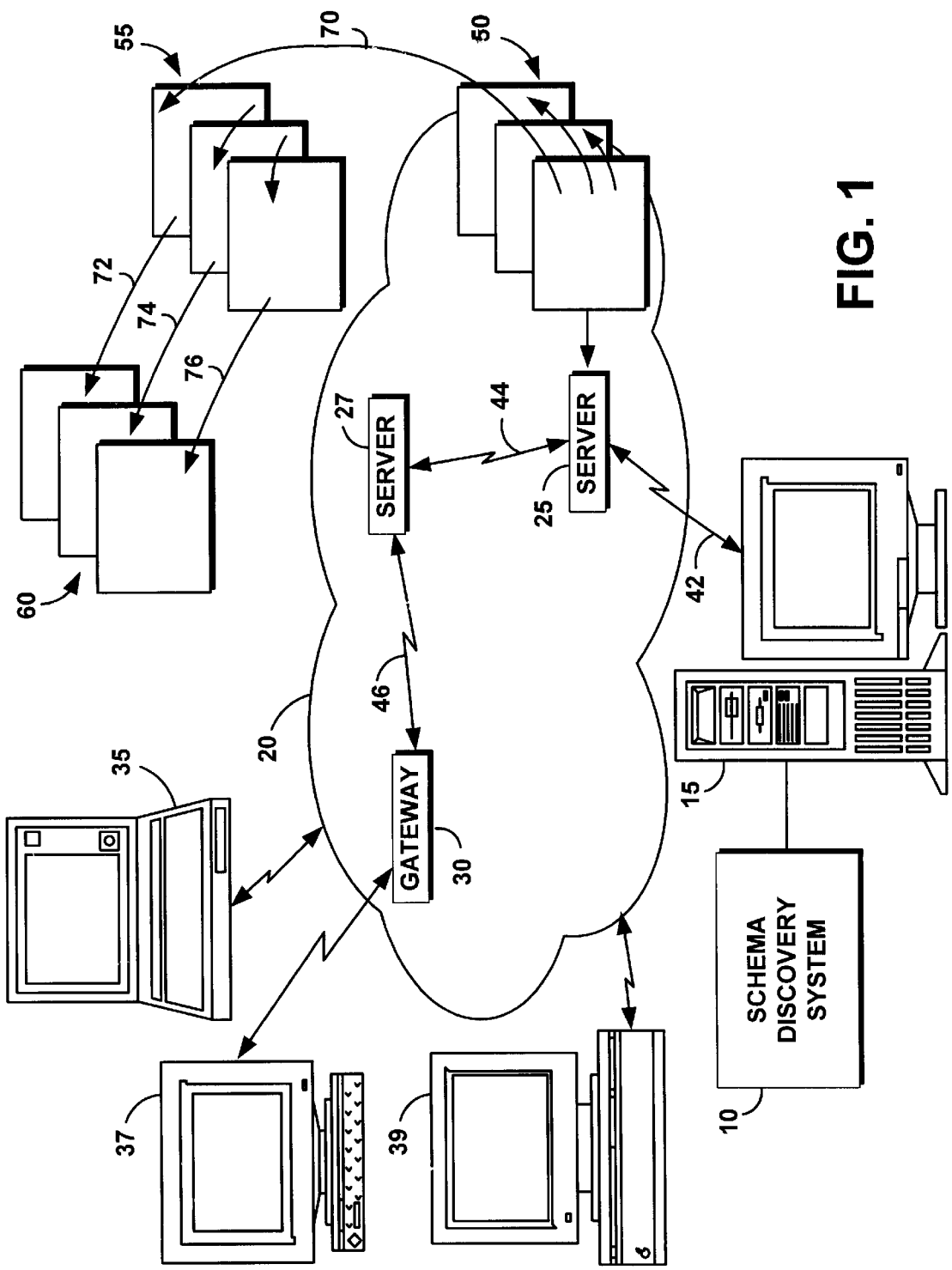
FIG. 1 is a schematic illustration of an exemplary operating environment in which a schema discovery system of the present invention can be used.

The following definitions and explanations provide background information pertaining to the technical field of the present invention, and are intended to facilitate the understanding of the present invention without limiting its scope:

Child (also daughter): From graph theory, a node pointed to by a path from a parent Constraint: Specifies a relationship between two or more keywords.

Crawler: A program that automatically explores the World Wide Web by retrieving a document and recursively retrieving some or all the documents that are linked to it.

Depth (level) of a node: The number of nodes from the root to the node in its tree.

Distance measure: A numeric metric between 0 and 1 (inclusive) that measures how similar two trees are. The lower is the distance measure, the more similar are the two trees. If the distance measure between two trees is below a user-defined threshold, the two trees are considered similar. Otherwise, they are considered dissimilar.

DTD (Document Type Definition) defines a schema of a semi-structured document such as SGML(Standard Generalized Markup Language), HTML, or XML documents.

Element: "Tagged" text; text encoded with formatting or other information

Flat: Devoid of structure

Flatten: To remove structure, especially from an entity with implicit tree structure, in order to achieve a simple collection of leaves Hit: A response to a search query on the WWW. The response is a document found by the search engine that contains key words or other attributes relevant to the search query.

HTML (Hypertext Markup Language): A standard language for attaching presentation and linking attributes to informational content within documents. During a document authoring stage, HTML. "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

HTML document: A document marked up in HTML.

Internet: A collection of interconnected public and private computer networks that are linked together with routers by a set of standards protocols to form a global, distributed network.

Keyword: A string that spells out the name of a concept.

Label of a node: The name of the node. It is one of the keywords specified by the user.

Label path: A label path is the concatenation of the names of the nodes in the path.

Leaf: Terminal node of a tree; a node with no child/daughter.

Markup language: A method of adding information to the text indicating the logical components of a document, or instructions for layout of the text on the page or other information which can be interpreted by some automatic system.

Node: A point or vertex in a graph.

Path: The sequence of nodes encountered in the route between any two nodes (inclusive).

Parent: The immediate predecessor of a node in a tree.

Root node: A node with no parent but typically with children.

Schema: A set of grammatical rules that define the allowed structure and syntax of a document. DTD is a specific type of schema, which is used to define XML documents.

Search engine: A remotely accessible World Wide Web tool that allows users to conduct keyword searches for information on the Internet.

Seed Set: An initial set of documents found by a search.

Semi-structured: Implying a loose schema, or not conforming to a fixed schema.

Server: A software program or a computer that responds to requests from a web browser by returning ("serving") web documents.

Subpath: Path A is a subpath of path B if the sequence of nodes of A is part of the sequence of nodes of B.

Tags: Codes (as in HTML or XML) that give instructions for formatting or action.

Tree: A hierarchical structure which is made up by nodes. Nodes are connected by edges from one node (parent) to another (child). A single node at apex of the tree is known as the root node, while the terminus of a path in the opposite direction is a leaf.

URL (Uniform Resource Locator): A unique address that fully specifies the location of a content object on the Internet. The general format of a URL is protocol://server-address/path/filename.

Vector: Broadly, a collection of objects or terms

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW, also Web): An Internet client—server hypertext distributed information retrieval system.

Xlink (XML Linking Language): An XML syntax that allows the specification of hyperlinks within XML documents. The Xlink framework makes it possible to target a specific section of a document and adds other options to make linking easier.

XML: extensible Markup Language. A standard, semi-structured language used for Web documents. During a document authoring stage, XML "tags" are embedded within the informational content of the document. These tags are not predefined and can be interpreted by different applications for different purposes, such as exchange of data, visual display. For example, when the web document (or "XML document") is subsequently transmitted by a web server to a web browser, the tags are interpreted by the browser and used to parse and display the document. In addition to specifying how the web browser is to display the document, XML tags can be used to create hyperlinks to other web documents.

Xpointer (XML Pointer Language): An XML syntax that allows the specification of hyperlinks within XML documents. Xpointer enables internal XML structures to be referenced rather than referencing the entire page. The syntax is appended to a URL from another page to point to an element inside an XML document.

FIG. 1 portrays the overall environment in which a schema discovery system 10 for semi-structured documents according to the present invention may be used. The system 10 includes a software or computer program product which is typically embedded within, or installed on a host server 15. Alternatively, the system 10 can be saved on a suitable storage medium such as a diskette, a CD, a hard drive, or like devices. While the system 10 will be described in connection with the WWW, the system 10 can be used with a stand-alone repository of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
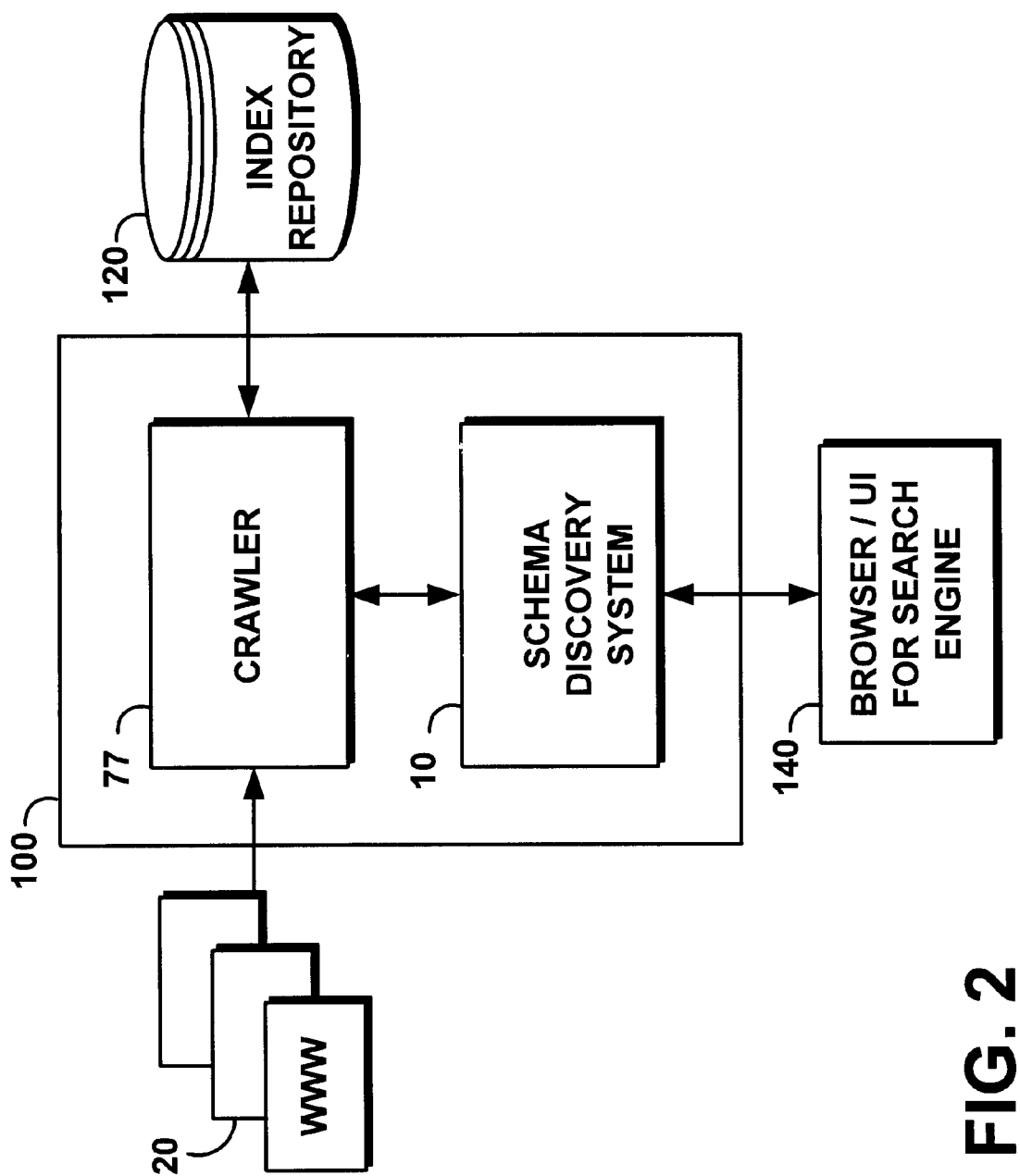
FIG. 2 is a block diagram that illustrates a high level architecture of the system of FIG. 1 shown used in the context of an Internet search.

FIG. 2 illustrates a high-level architecture showing the system 10 used in the context of an Internet environment. The system 10 resides between the user and the semi-structured documents available for search on the WWW 20. Documents judged to fall into a given category by the system will be made available to the user for their perusal and possible use.

As a specific example, a user employs a browser or a user interface (UI) 140 to enter a search query that is transmitted to a search service provider 100. In turn, the search service provider 100, accesses the system 10. The system automatically searches the semi-structured documents on the WWW 20. The search results will be sent to the user via the search service provider 100. The search results may include a list of URLs and associated brief abstracts describing the nature of the resources found.

In the first step, a document classification system will be described in more detail with further reference to FIG. 3. Raw HTML files 300 may be searched for, selected or downloaded and stored according to criteria representing resumes such as keywords such as "resume", "job application", "job search", or a combination of words and phrases such as "job experience", "university education" etc. The schematic structures 305 are extracted from the HTML files by determining common keywords, and section titles in the HTML files 300. The HTML files may hierarchically refer to other files and point to other locations, thus the files may need flattening to incorporate elements from several locations into one file. Keywords are also extracted from the HTML files which will be used to subsequently determine the DTD. The HTML files are rewritten into XML format. Keywords identify important concepts in the HTML documents. The schematic structures of markup documents are extracted and represented as sets of ordered trees with nodes labeled by a set of keywords input from the user. Reordering rules are used to reconfigure the trees so that its structure resembles the semantic structures of the HTML documents more closely.

At step 310 ordered trees are mapped to sets of label paths, therefore ignoring ordering and repetitive information. The assumption is that choosing an imprecise representation helps to reveal common patterns. The technique is to incrementally explore label paths of increasing length which are analyzed by constraint rules to discover frequent label paths at step 315, for example, as described in the copending U.S. patent application Ser. No. 09/531,019.

Figure 4A:
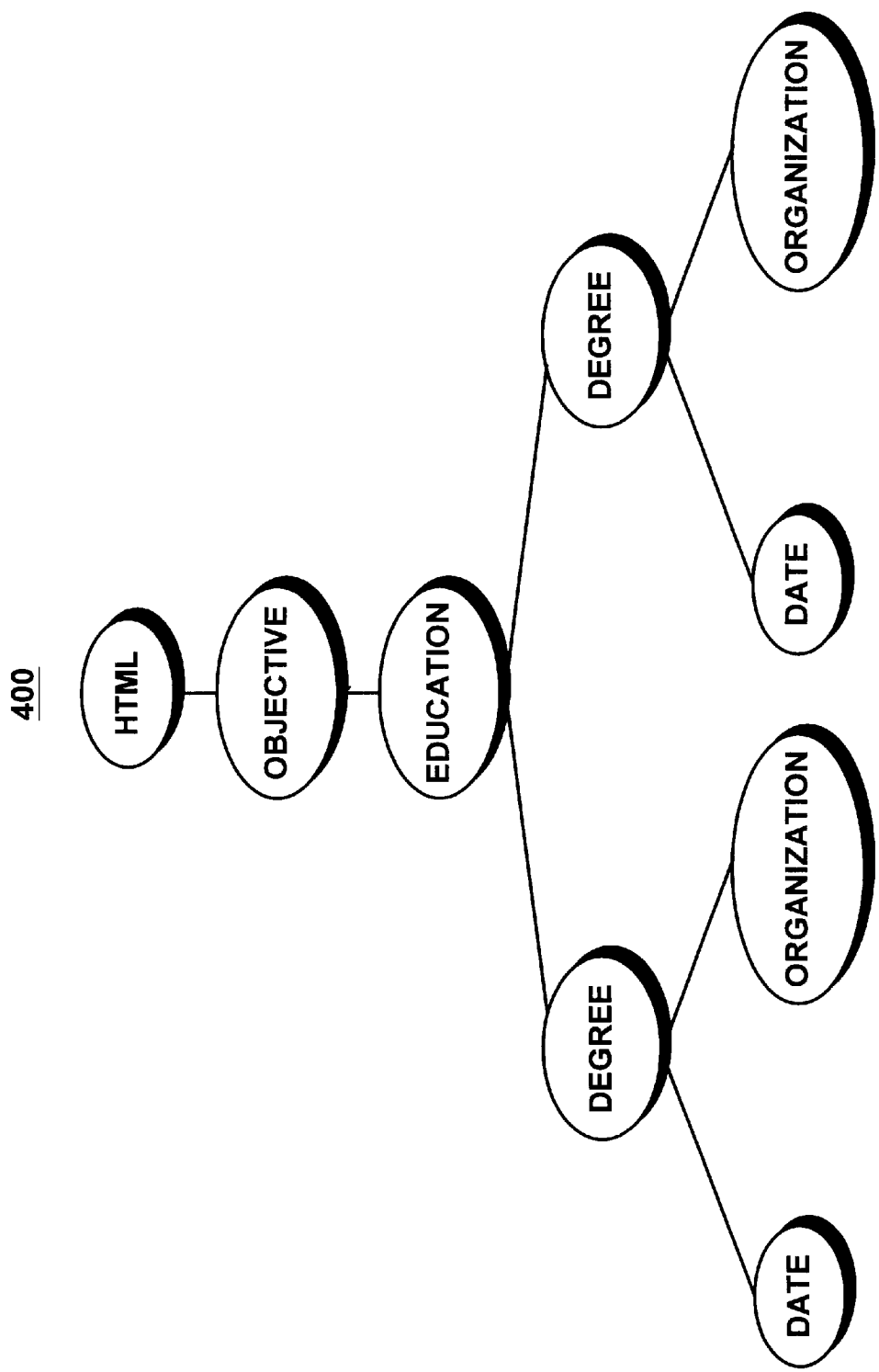
FIG. 4 is comprised of FIGS. 4A, 4B and 4C, and illustrates three exemplary trees representing three hypertext documents.

An exemplary tree 400 is shown in FIG. 4A where the zero level is the HTML identifier, followed by the objective label describing the type of job the individual is looking for, and further illustrating the applicant's educational qualifications such as date, degree, and organizations.

Figure 4B:
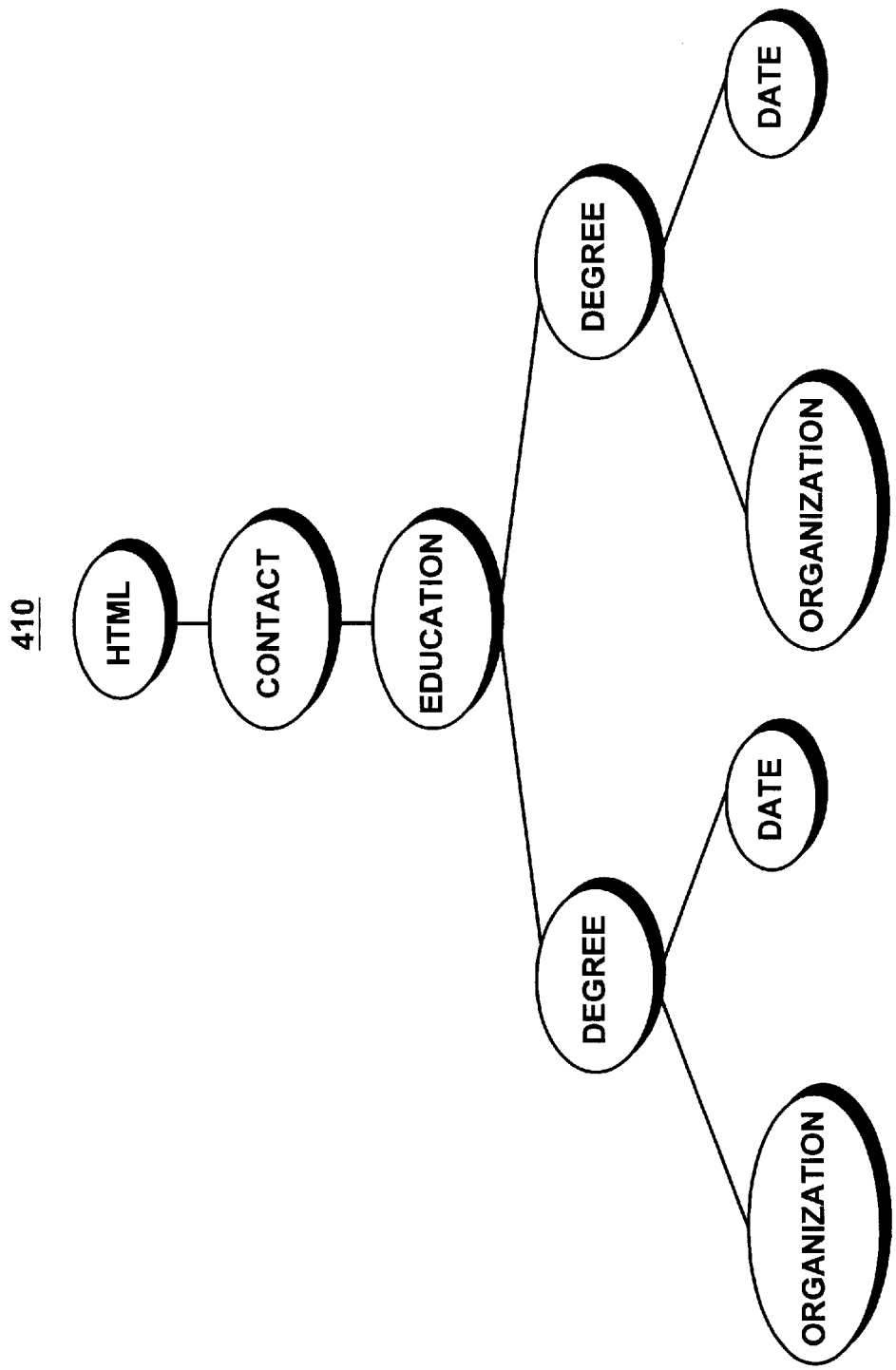

An illustration of another common sequence or tree 410 is also shown in FIG. 4B, where the contact information is the starting information, and education is highlighted in the sequence of education, degree, date, and organization.

Figure 4C:
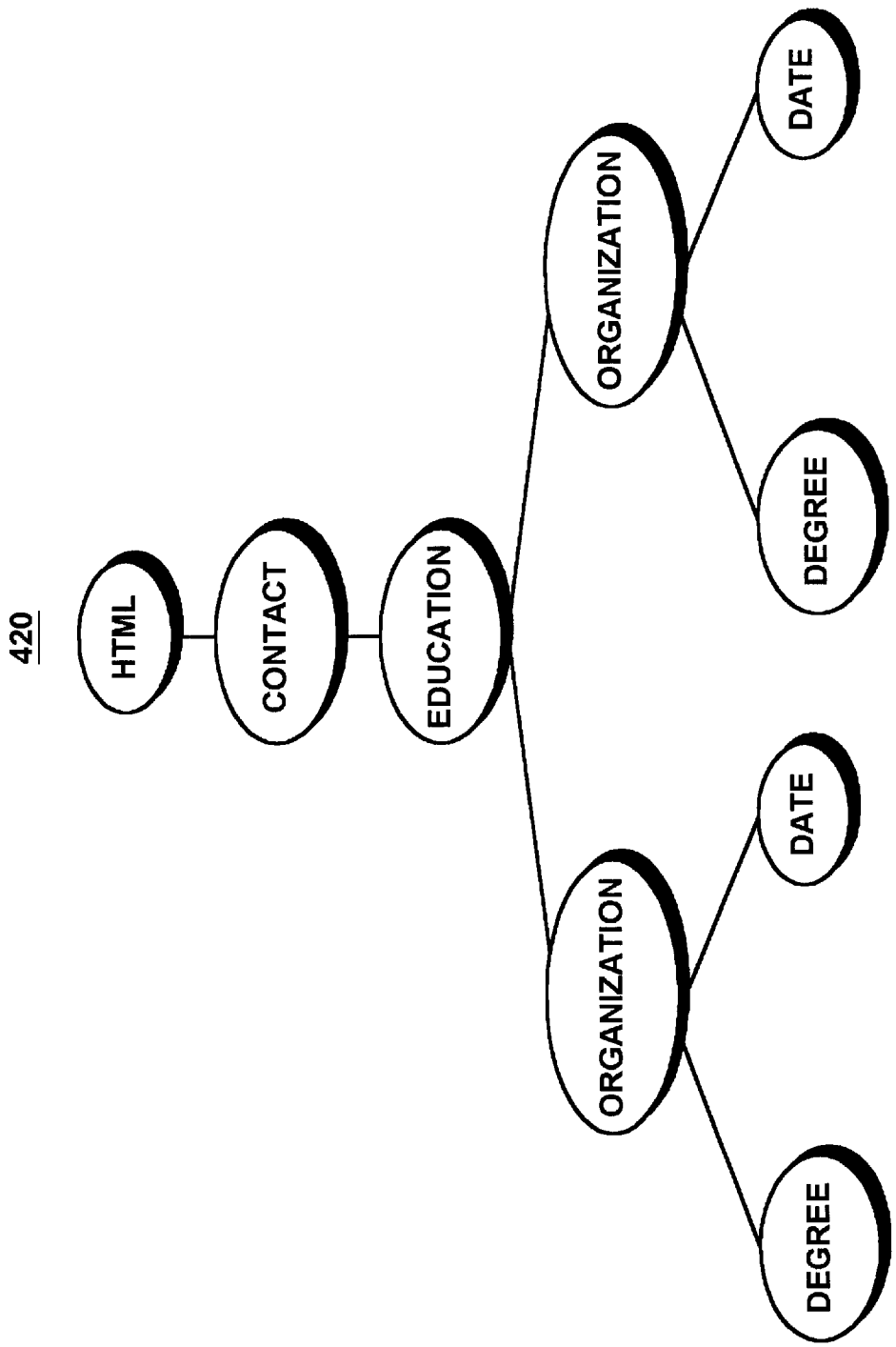

FIG. 4C illustrates yet another common configuration or tree 420, in which the contact information is the starting information and education is highlighted in the sequence of education, organization, degree and date.

Figure 5:
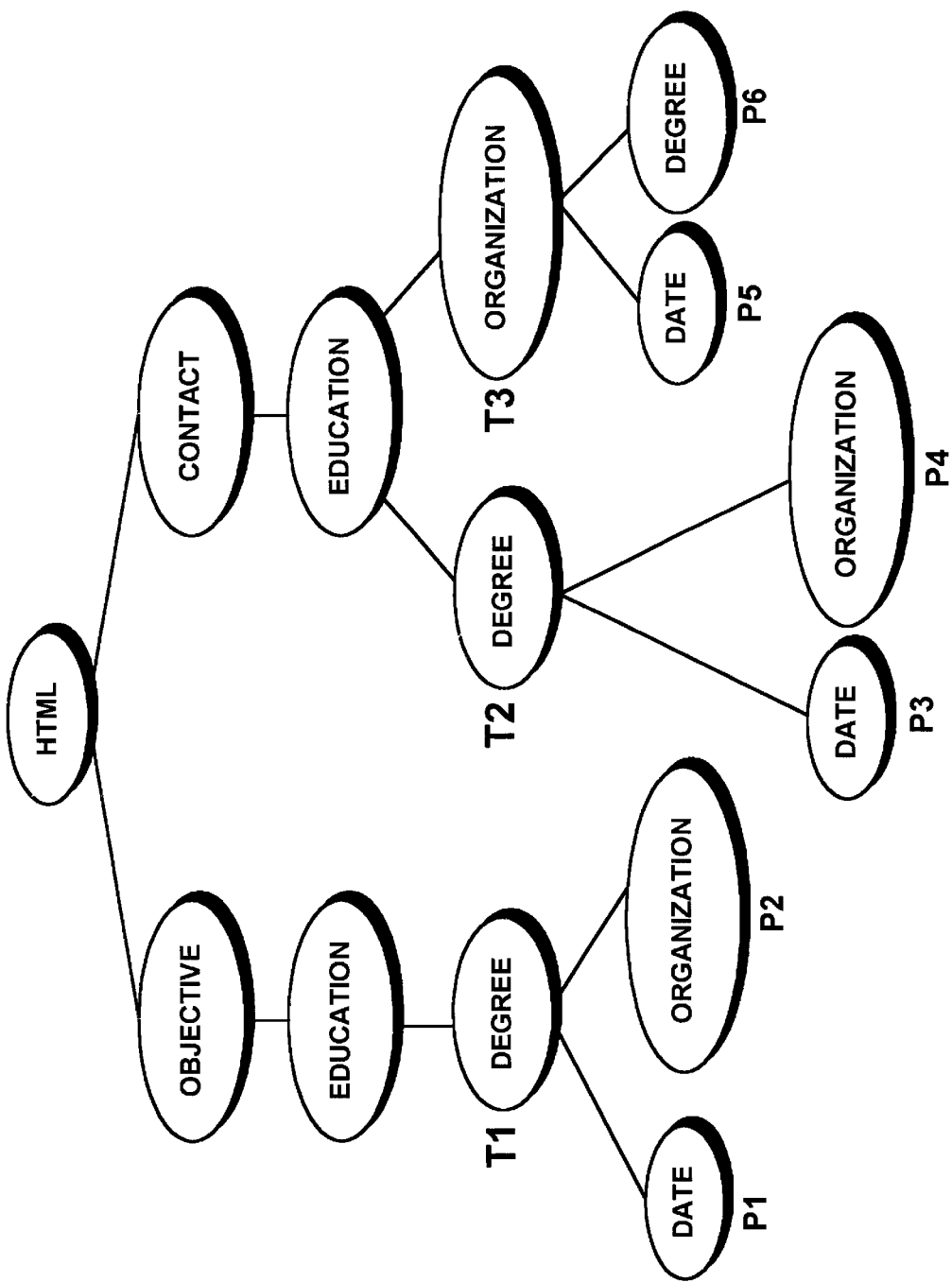
FIG. 5 shows the tree corresponding to the set of label paths to which the trees of FIGS. 4A, 4B and 4C are mapped.

A possible tree ordering is shown in FIG. 5, which illustrates how the data in FIG. 4A through 4C may generate several trees T1, T2, T3, and different label paths p1, p2, p3, p4, p5, p6. While it may be relatively easy for a human to find equivalencies among small number of these label paths p1, p2, p3, p4, p5, p6, it is significantly more difficult to do so for a large number of label paths. The present invention addresses the solution to the problem of automating the analysis of equivalencies in the label paths.

Returning to FIG. 3, the method 300 uses a set of constraints at step 315 to analyze the label paths to determine the most frequent path or paths. Prevalent patterns among the trees are label paths that occur frequently among all the HTML documents. A constraint mechanism for users may be introduced to specify restriction on the forms of schematic structures in the common schema. This helps to reduce the search space and to filter out noise. The set of frequent label paths satisfying the constraints are discovered by finding the most common label paths among the trees at depths of 1 or more, and then reordering the label paths and searching again for common label paths of increasing length. The task is to minimize searching in a simple heuristic. By using constraints to limit the search space the problem of searching may be greatly simplified.

An example of two simple constraints that can be used to limit the search space is the following:

(1) A keyword cannot appear more than once along a label path, and (2) the set of keywords is divided into two sets: title keywords and content keywords. Title keywords can for example be the title of a resume, and hence can only occur as first level nodes in the tree. Content keywords describe the content of title keywords and hence can only occur at a depth of greater than one in the tree. These simple constraints can significantly reduce the analytical computer processing time.

For example, the label paths in the tree 400 of FIG. 4A of length 5 are:

html.objective.education.degree.date, html.objective.education.degree.organization, and the label paths in the tree 410 of FIG. 4B of length 5 are:

html.contact.education.degree.organization, html.contact.education.degree.date.

Figure 3:
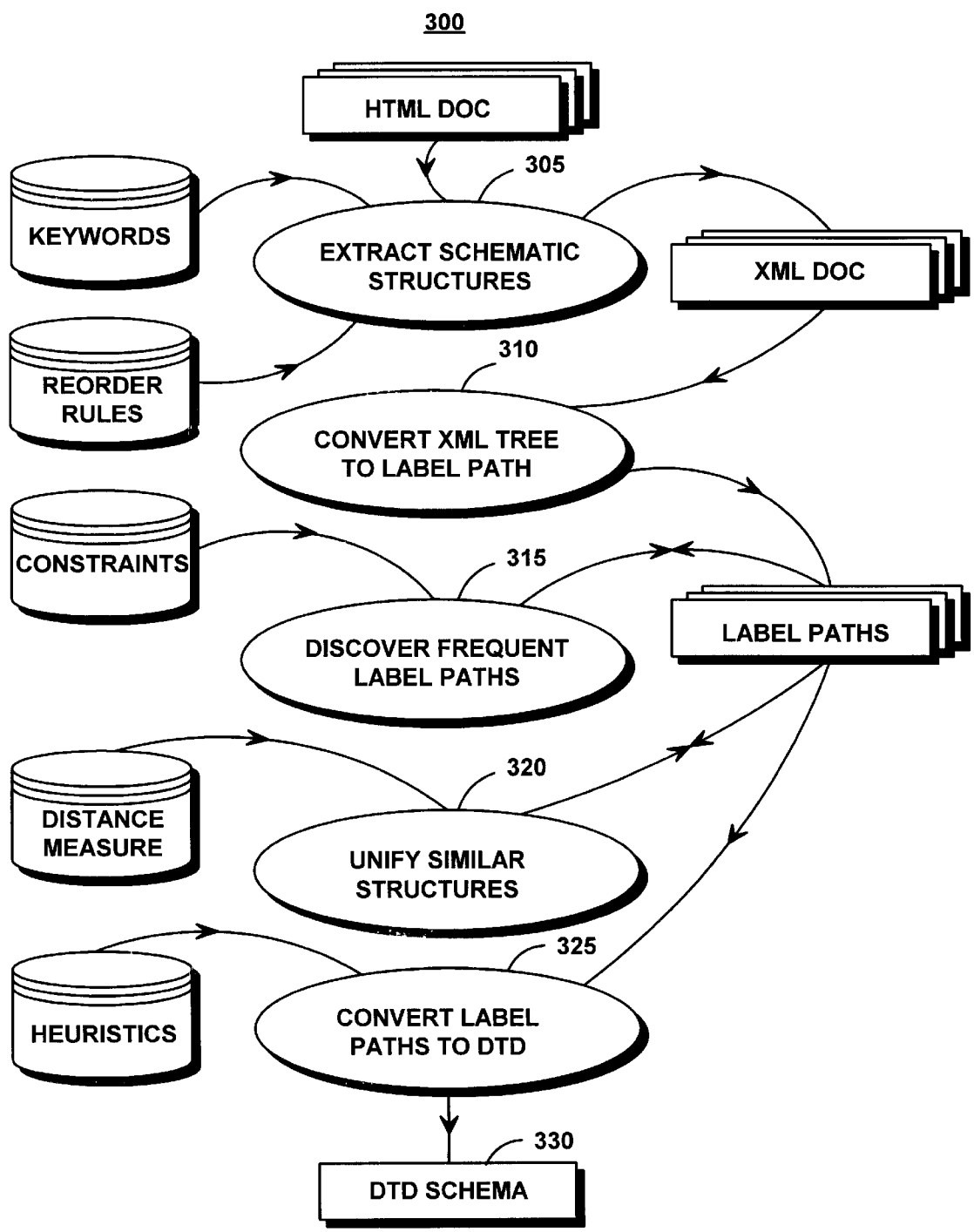
FIG. 3 is a flow chart representing a schema discovery method implemented by the system of FIG. 2.

With reference to FIG. 3, the method 300 identifies and unifies similar subtree structures at step 320. Since the documents share similar but inexact schematic structures, there are repetitive structures among the common tree structures discovered. These repetitive subtrees are identified by a notion of distance measure. Subtrees that are similar have small distance measure and are subsequently merged together by flattening their structures up to certain depth, and by combining the flattened nodes into one level.

In a fifth step, once the common label paths 325 have been found, a majority schema describing the XML documents has been determined. The majority schema is translated into an XML DTD 330 by a number of heuristics that can recover information lost in the discovery process, such as order among sibling elements, number of occurrences of an element in another element. Minority schematic structures in the HTML documents are filtered out by the majority schema (and hence its name) which are not described in the DTD, resulting in a more concise DTD.

An example of an XML DTD schema extracted from an experimental run of the schema on 380 resume documents downloaded from the WWW in HTML form is as follows:

```
<!element RESUME     ((#PCDATA), CONTACT, OBJECTIVE?,
    EDUCATION, COURSES?, EXPERIENCE, AWARDS?,
    ACHIEVEMENTS, SKILLS?, ACTIVITIES, REFERENCE?)>
<!element CONTACT    (#PCDATA)>
        <!-- Contact information of the author, e.g.
        name, address -->
<!element OBJECTIVE  (#PCDATA)>
        <!-- Objective section of a resume -->
<!element EDUCATION  ((#PCDATA), (INSTITUTE,
DATE-ENTRY)+)>
        <!-- Educational background section of a resume
        -->
<!element INSTITUTE  ((#PCDATA)>
        <!-- Academic entities, e.g. universities,
        colleges -->
<!element DATA-ENTRY ((#PCDATA), DEGREE?)>
<!element DEGREE     (#PCDATA)>
        <!-- Educational degrees, e.g. B. Sci. -->
        <!element COURSES    ((#PCDATA), DATE*)>
            <!-- Courses section, describing courses taken
            by the author -->
<!element DATE       (#PCDATA)>
        <!-- Date -->
<!element EXPERIENCE ((#PCDATA), (DATE, TITLE?)*)>
        <!-- Experience section, e.g. working
        experience,    professional
        experience -->
<!element TITLE      (#PCDATA), INSTITUTE?)>
<!element AWARDS     (#PCDATA), DATE-ENTRY3+)>
        <!-- Awards section, e.g. fellowship,
        scholarship -->
<!element DATE-ENTRY3    ((#PCDATA),
(INSTITUTE?, AWARD*))>
<!element AWARD      (#PCDATA)>
        <!-- The award obtained -->
<!element ACHIEVEMENTS ((#PCDATA), (DATE, INSTITUTE2?)*)>
        <!-- Achievements section, e.g. publications,
        presentations -->
<!element INSTITUTE 2    ((#PCDATA), (DATE, TITLE2)+)>
<!element TITLE2     (#PCDATA)>
        <!-- Title of an employment position -->
<!element SKILLS     ((#PCDATA), (SKILL, DATE)?)>
        <!-- Skills section, e.g. language skills,
        computer skills -->
<!element SKILL      (#PCDATA)>
        <!-- The skill described -->
<!element ACTIVITIES ((#PCDATA), DATE-ENTRY4+)>
        <!-- Activities section, e.g. hobbies, extra-
        curricular activities -->
<!element DATE-ENTRY4    ((#PCDATA), TITLE2?)>
<!element REFERENCE  ((#PCDATA), (DATE*, TITLE?))>
        <!-- Reference section of a resume -->
```

It is to be understood that the specific embodiments of the present invention that have been described are merely illustrative of certain applications of the principle of the present invention. Numerous modifications may be made to the computation scheme of the XML DTD schema described herein without departing from the spirit and scope of the present invention. For example, while the present invention is described for illustration purpose in relation to the WWW, it should be clear that the invention is applicable as well to databases and other tables with indexed entries. Also, while the present invention is described for illustration purpose only in relation to the resume documents, it should be clear that the invention is applicable as well to various other profiles or structured document types.

What is claimed is:

1. A method for discovering a majority schema from a set of related documents that share similar schemas, comprising:

extracting a set of schematic structures of the documents;

converting the schematic structures to sets of label paths;

discovering a set of frequent label paths from amongst the sets of label paths;

unifying similar schematic structures of the documents based on the set of frequent label paths that represents a majority schema;

expressing the majority schema in a predefined language;

wherein extracting schematic structures of the documents includes representing the schematic structures as sets of ordered trees with nodes labeled by a set of keywords:

wherein extracting schematic structures includes acquiring XML documents;

wherein extracting schematic structures includes placing title keywords and content keywords in ordered trees according to a specified depth;

wherein discovering a set of frequent label paths includes introducing a constraint mechanism to specify a restriction on the schematic structures in the majority schema, to help reduce noise and to improve efficiency; and wherein discovering a set of frequent label paths further includes discovering a set of frequent label paths satisfying the constraint mechanism.

2. The method according to claim 1, wherein extracting schematic structures includes using reordering rules to reconfigure the trees.

3. The method according to claim 1, wherein converting the schematic structures to sets of label paths includes mapping ignoring repetitive information.

4. The method according to claim 1, wherein unifying similar schematic structures includes using a clustering approach based on a predetermined tree distance.

5. The method according to claim 1, wherein converting the set of frequent label paths to a predefined structured schema includes converting the set of frequent label paths to an XML DTD schema.

6. A computer program product for discovering a majority schema from a set of related documents that share similar schemas, comprising:

a schema discovery system for extracting a set of schematic structures of the documents;

the schema discovery system converting the schematic structures to sets of label paths;

the schema discovery system discovering a set of frequent label paths from amongst the sets of label paths;

the schema discovery system unifying similar schematic structures of the documents based on the set of frequent label paths; and the schema discovery system expressing the set of frequent label paths in a predefined language;

wherein the schema discovery system extracts the set of schematic structures of the documents by representing the schematic structures as sets of ordered trees with nodes labeled by a set of keywords;

wherein the schematic structures include XML documents;

wherein the schematic structures are extracted by placing title keywords and content keywords in ordered trees according to a specified depth;

wherein the schema discovery system discovers a set of frequent label paths by introducing a constraint mechanism to specify a restriction on the schematic structures in the majority schema, to help reduce noise and to improve efficiency; and wherein the schema discovery system further discovers a set of frequent label paths satisfying the constraint mechanism.

7. The computer program product according to claim 6, wherein the schema discovery system acquires the set of related documents from the World Wide Web.

8. The computer program product according to claim 6, wherein the set of related documents includes XML documents.

9. The computer program product according to claim 8, wherein the majority schema includes a majority XML DTD schema.

* * * * *